(12) United States Patent  (10) Patent No.: US 9,164,640 B2
Maharyta  (45) Date of Patent: Oct. 20, 2015

(54) BARRIER ELECTRODE DRIVEN BY AN EXCITATION SIGNAL

(71) Applicant: CYPRESS SEMICONDUCTOR CORPORATION, San Jose, CA (US)

(72) Inventor: Andriy Maharyta, Lviv (UA)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 14/293,762

(22) Filed: Jun. 2, 2014

(65) Prior Publication Data

US 2015/0248177 A1  Sep. 3, 2015

Related U.S. Application Data

(60) Provisional application No. 61/946,492, filed on Feb. 28, 2014.

(51) Int. Cl.
*G06F 3/044* (2006.01)

(52) U.S. Cl.
CPC .................................... *G06F 3/044* (2013.01)

(58) Field of Classification Search
CPC ................. G06F 3/0416; G06F 3/044; G06F 2203/04108; G06F 2203/04107
USPC ......... 345/174, 179; 178/18.06, 18.08, 19.03, 178/8.06, 19.031, 119.03
See application file for complete search history.

(56) References Cited

U.S. PATENT DOCUMENTS

| 8,674,972 B2 | 3/2014 | Kurokawa et al. |
| 2011/0147746 A1 | 6/2011 | Kim et al. |
| 2012/0043971 A1* | 2/2012 | Maharyta ........................ 324/658 |
| 2012/0044199 A1* | 2/2012 | Karpin et al. ................... 345/174 |
| 2012/0050180 A1* | 3/2012 | King et al. ...................... 345/173 |
| 2012/0050214 A1* | 3/2012 | Kremin et al. .................. 345/174 |
| 2012/0074961 A1 | 3/2012 | Herrmann |
| 2012/0075249 A1 | 3/2012 | Hoch |

(Continued)

FOREIGN PATENT DOCUMENTS

| CN | 102221951 B | 12/2013 |
| EP | 2620845 A1 | 7/2013 |

OTHER PUBLICATIONS

Patentability Search Report for Reference No. CD13079. Apr. 2014. 3 pages.

(Continued)

*Primary Examiner* — Hong Zhou
(74) *Attorney, Agent, or Firm* — Lowenstein Sandler LLP

(57) ABSTRACT

Apparatuses and methods of driving barrier electrodes of a capacitive-sense array with an excitation signal are described. One apparatus includes a capacitance-sensing circuit coupled to a capacitive-sense array including multiple electrodes. The capacitance-sensing circuit includes multiple sensing channels. The capacitance-sensing circuit is operative to measure signals on a first subset of the multiple electrodes using the multiple sensing channels. Each of the sensing channels is selectively coupled to one of the first subset of electrodes. The capacitance-sensing circuit is further operative to drive a barrier electrode of the multiple electrodes with an excitation signal while measuring the signals on the first subset. The excitation signal is greater in magnitude than the measured signals. The barrier electrode is adjacent to an edge electrode of the first subset that is coupled to one of the sensing channels. A second subset of electrodes can be driven by a shield signal and the excitation signal is greater in magnitude than the shield signal.

15 Claims, 9 Drawing Sheets

(56) References Cited

U.S. PATENT DOCUMENTS

| | | | |
|---|---|---|---|
| 2013/0285971 A1* | 10/2013 | Elias et al. | 345/174 |
| 2013/0320467 A1 | 12/2013 | Buchanan et al. | |
| 2013/0335370 A1 | 12/2013 | Heo et al. | |
| 2014/0085246 A1* | 3/2014 | Shahparnia | 345/174 |

OTHER PUBLICATIONS

Young-Jin Choi, et al., Novel fabrication of an SnO2 nanowire gas sensor with high sensitivity. IOP Science Nanotechnology vol. 10 No. 9, 2 pages.

* cited by examiner

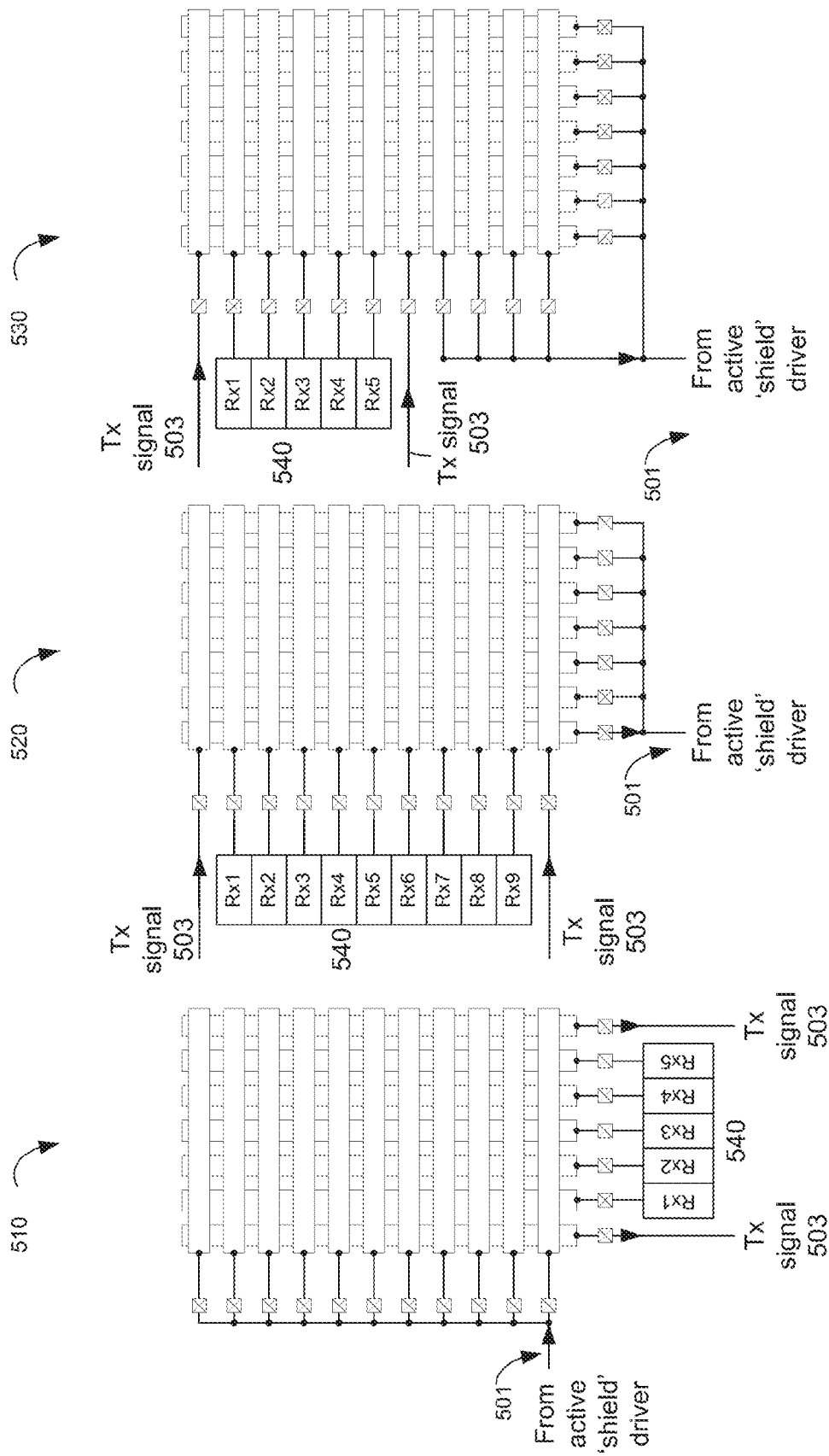

BARRIER ELECTRODE DRIVEN BY AN EXCITATION SIGNAL

RELATED APPLICATIONS

This application claims the benefit of U.S. Provisional Application No. 61/946,492, filed Feb. 28, 2014, the entire contents of which are incorporated by reference herein.

TECHNICAL FIELD

The present disclosure relates generally to sensing systems, and more particularly to capacitance-sensing systems to drive barrier electrodes with an excitation signal.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

FIG. 5A illustrates a capacitive-sense array of two orthogonal layers with some electrodes driven with a shield signal and barrier electrodes driven with an excitation signal according to one embodiment.

FIG. 5B illustrates a capacitive-sense array of two orthogonal layers with some electrodes driven with a shield signal and barrier electrodes driven with an excitation signal according to another embodiment.

FIG. 5C illustrates a capacitive-sense array of two orthogonal layers with some electrodes driven with a shield signal and barrier electrodes driven with an excitation signal according to another embodiment.

DETAILED DESCRIPTION

Figure 1:
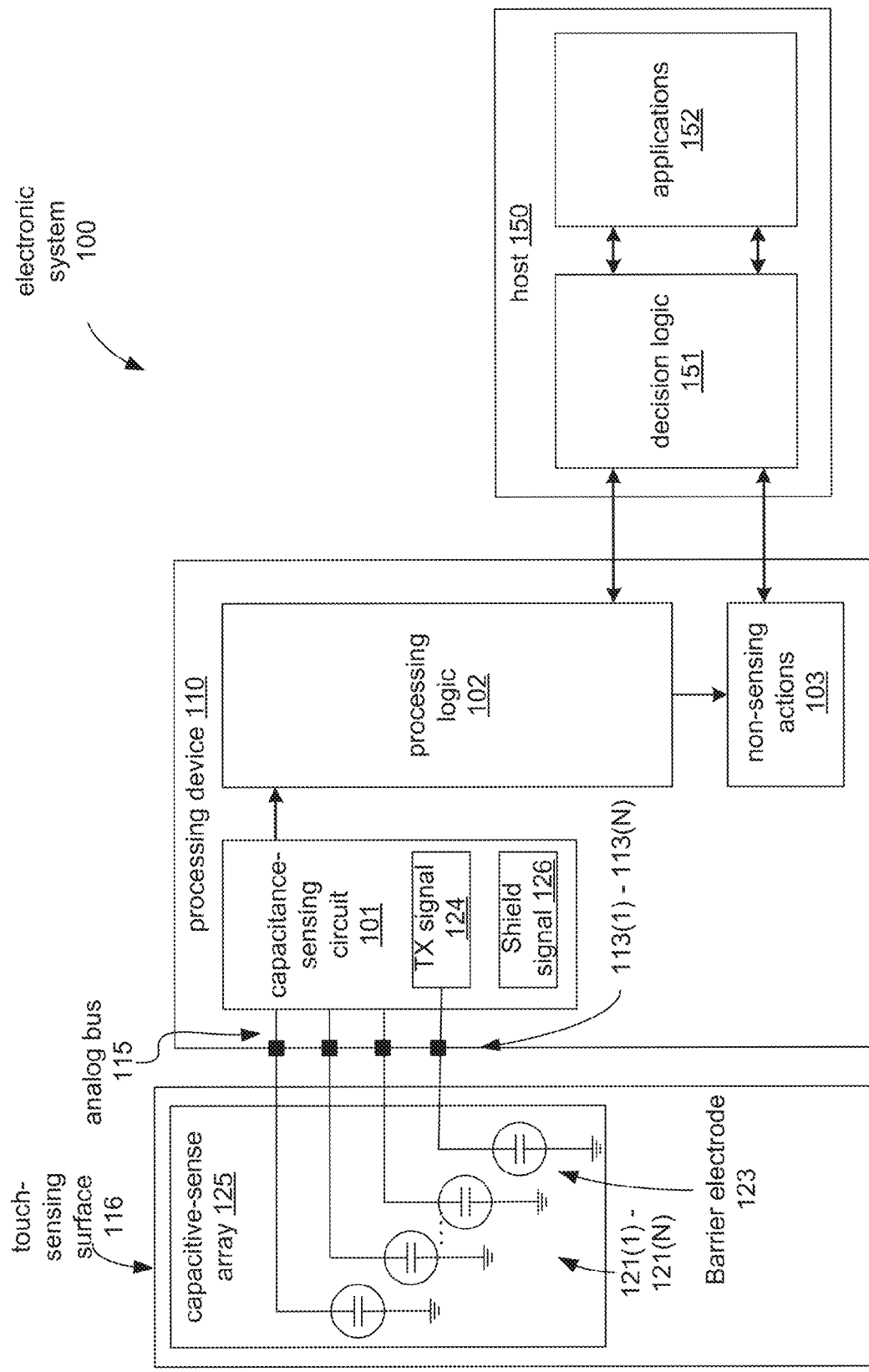
FIG. 1 is a block diagram illustrating one embodiment of an electronic system having a processing device for driving barrier electrodes.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Apparatuses and methods of driving barrier electrodes of a capacitive-sense array with an excitation signal are described. One apparatus includes a capacitance-sensing circuit coupled to a capacitive-sense array including multiple electrodes. The capacitance-sensing circuit includes multiple sensing channels. The capacitance-sensing circuit is operative to measure signals on a first subset of the multiple electrodes using the multiple sensing channels. Each of the sensing channels is selectively coupled to one of the first subset of electrodes. The capacitance-sensing circuit is further operative to drive a barrier electrode of the multiple electrodes with an excitation signal while measuring the signals on the first subset. The excitation signal is greater in magnitude than the measured signals. The barrier electrode is adjacent to an edge electrode of the first subset that is coupled to one of the sensing channels. A second subset of electrodes can be driven by a shield signal and the excitation signal is greater in magnitude than the shield signal.

The apparatus further includes processing logic coupled to the capacitance-sensing circuit. The capacitance-sensing circuit converts the measured signals to digital values representing self-capacitance measurements of the first subset, and the processing logic detect a proximity event of a conductive object based on the digital values. The driving of the barrier electrodes while measuring the signals on the first subset increases a detection distance of the capacitance-sensing circuit. In some embodiments, a surface area to the first subset of electrodes is at least partially surrounded, or encompassed, by the barrier electrodes. For example, the barrier electrodes may be adjacent to one or more edge electrodes of the first subset, such as the adjacent row or column electrode to the edge row or edge column electrode of the first subset, as described in more detail herein.

It should be noted that in the embodiments described herein discuss the capacitive-sense array as having electrodes, also referred to as sense elements. The sense elements are electrodes disposed in various configurations and the self-capacitance of an electrode or a mutual capacitance between two electrodes can be measured to detect a conductive object proximate to the capacitive-sense array. Sense elements are sometimes referred to as sensors, but it should be understood that the sensors do not include circuitry to measure the capacitance. Rather, capacitance-sensing circuit, which can also be referred to as a capacitance sensor, measures the capacitances of the sensors (herein referred to as electrodes or sense elements). Various embodiments described herein may be used in other touch sensing technologies than just capacitive-sense arrays, such as touch panels, touch buttons, touch screens, or the like. It should also be noted that various embodiments describe row and column electrodes, represented as rectangular bars. However, in other embodiments, different shapes and configurations of the electrodes are possible. The barrier electrodes can be dedicated electrodes used for proximity detection, or may be electrodes that are selectively configured to operate as barrier electrodes by nature of being driven by the excitation signal as described herein. Various embodiments of the barrier electrodes and excitation signals are described below with respect to FIGS. 1-8.

FIG. 1 is a block diagram illustrating one embodiment of an electronic system 100 having a processing device 110 for driving barrier electrodes. The processing device 110 that may be configured to measure capacitances from a touch-sensing surface 116 including a capacitive-sense array 121. In one embodiment, a multiplexer circuit may be used to connect a capacitive-sensing circuit 101 with a sense array 121 in various configurations. The electronic system 100 includes a touch-sensing surface 116 (e.g., a touchscreen, or a touch pad) coupled to the processing device 110, which is coupled to a host 150. In one embodiment the touch-sensing surface 116 is a two-dimensional sense array 121 that uses processing device 110 to detect touches on the surface 116.

In one embodiment, the sense array 121 includes electrodes 121(1)-121(N) (where N is a positive integer) that are disposed as a two-dimensional matrix (also referred to as an XY matrix). As described herein, the capacitive-sense array 121 also includes one or more barrier electrodes, such as barrier electrode 123. The sense array 121 is coupled to pins 113(1)-113(N) of the processing device 110 via one or more analog buses 115 transporting multiple signals. In a further embodiment, a multiplexer (not illustrated) can be used to couple the capacitance-sensing circuit 101 in various configurations as described herein. The capacitive sense array 121 may include a multi-dimension capacitive sense array. The multi-dimension sense array includes multiple sense elements, organized as rows and columns. In another embodiment, the capacitive sense array 121 operates as an all-points-addressable ("APA") mutual capacitive sense array. In another embodiment, the capacitive sense array 121 is non-transparent capacitive sense array (e.g., PC touchpad). The capacitive sense array 121 may be disposed to have a flat surface profile. Alternatively, the capacitive sense array 121 may have non-flat surface profiles. Alternatively, other configurations of capacitive sense arrays may be used. For example, instead of vertical columns and horizontal rows, the capacitive sense array 121 may have a hexagon arrangement, or the like, as would be appreciated by one of ordinary skill in the art having the benefit of this disclosure. In one embodiment, the capacitive sense array 121 may be included in an ITO panel or a touch screen panel.

In one embodiment, the capacitance-sensing circuit 101 may include one or more receive (RX) channels to measure charge on the electrodes. There are various methods of measuring capacitance on the capacitive-sense array 121, such as self-capacitance sensing and mutual capacitance sensing. The RX channels may include a relaxation oscillator or other means to measure capacitance and a counter or timer to measure the oscillator output. In another embodiment, the RX channels include an operational amplifier, a switch, and an integrator capacitor, as described and illustrated with respect to FIG. 2. The RX channels measure the signals representing the self-capacitance of the electrodes 121(1)-121(N). The capacitance-sensing circuit 101 also includes a converter circuit, such an analog-to-digital converter (ADC) that converts the measured signals into digital values. The processing device 110 may further include software components to convert the count value (e.g., capacitance value) into a touch detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance-sensing circuit 101 may be evaluating other measurements to determine the user interaction. For example, in the capacitance-sensing circuit 101 having a sigma-delta modulator, the capacitance-sensing circuit 101 is evaluating the ratio of pulse widths of the output (i.e., density domain), instead of the raw counts being over or under a certain threshold. It should be noted that the RX channels may be one type of sensing channel that can be configured for different operational modes. For example, the RX channels in a self-capacitance mode are configured as sensing channels for driving and sensing an electrode to measure a self-capacitance of the electrode relative to ground. The RX channels can also be configured to be sensing channels for a mutual capacitance mode in which a mutual capacitance between a first electrode (RX) and a second electrode (TX). The TX electrode in this mode is driven by a TX signal, as described herein. Alternatively, the RX channels can be configured for a self-capacitance and mutual capacitance mode in which self-capacitance and mutual capacitance can be measured concurrently or sequentially.

In another embodiment, the capacitance-sensing circuit 101 includes a TX signal generator to generate a TX signal 124 to be applied to the TX electrode and a receiver (also referred to as a sensing channel), such as an integrator, coupled to measure an RX signal on the RX electrode. In a further embodiment, the capacitance-sensing circuit includes an analog-to-digital converter (ADC) coupled to an output of the receiver to convert the measured RX signal to a digital value (capacitance value). The digital value can be further processed by the processing device 110, the host 150 or both. Normally, the TX signal 124 is used during mutual capacitance sensing. However, as described herein, the capacitance-sensing circuit 101 can use the TX signal 124 as an excitation signal to drive the barrier electrode(s) 123 while measuring the signals (RX signals) from the electrodes 121(1)-121(N). Driving the barrier electrode(s) 123 with the excitation signal (TX signal 124) increases a detection distance of the processing device 110.

The processing device 110 is configured to detect one or more touches on a touch-sensing device, such as the capacitive sense array 121. The processing device can detect conductive objects, such as touch objects 140 (fingers or passive styluses, an active stylus, or any combination thereof. The capacitance-sensing circuit 101 can measure touch data on the capacitive sense array 121. The touch data may be represented as multiple cells, each cell representing an intersection of sense elements (e.g., electrodes) of the capacitive sense array 121. An intersection between two sense elements may be understood as a location at which one sense electrode crosses over or overlaps another, while maintaining galvanic isolation from each other.

The capacitive sense elements are electrodes of conductive material, such as copper. The sense elements may also be part of an ITO panel. The capacitive sense elements can be configurable to allow the capacitance-sensing circuit 101 to measure self-capacitance, mutual capacitance, or any combination thereof. In another embodiment, the touch data is a 2D capacitive image of the capacitive sense array 121. In one embodiment, when the capacitance-sensing circuit 101 measures mutual capacitance of the touch-sensing device (e.g., capacitive sense array 121), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host 150 (e.g., host processor), as well as other information.

In one embodiment, the processing device 110 further includes processing logic 102. Operations of the processing logic 102 may be implemented in firmware; alternatively, they may be implemented in hardware or software. The processing logic 102 may receive signals from the capacitance-sensing circuit 101, and determine the state of the sense array 121, such as whether an object (e.g., a finger) is detected on or in proximity to the sense array 121 (e.g., determining the presence of the object), resolve where the object is on the sense array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sense array 121 (e.g., keyboard, keypad, mouse, trackball, LEDs, displays, or other peripheral devices).

As illustrated, capacitance-sensing circuit 101 may be integrated into processing device 110. Capacitance-sensing circuit 101 may include analog I/O for coupling to an external component, such as touch-sensor pad (not shown), capacitive sense array 121, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques, or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-4xx, or TMA-xx families of touch screen controllers. Alternatively, other capacitance-sensing circuits may be used. The capacitive sense arrays, or touch screens, as described herein, may include a transparent, conductive sense array disposed on, in, or under either a visual display itself (e.g. LCD monitor), or a transparent substrate in front of the display.

In an embodiment, the TX and RX electrodes are configured in rows and columns, respectively. It should be noted that the rows and columns of electrodes can be configured by the processing device 110 (or capacitance-sensing circuit 101) as individual electrodes for self-capacitance measurements, as TX or RX electrodes for mutual capacitance measurements, in any combination. Similarly, the processing device 110 (or capacitance-sensing circuit 101), such as via a multiplexer, can configure the electrodes as RX electrodes for self-capacitance sensing, and one or more electrodes as barrier electrodes. In a further embodiment, the processing device 110 (or capacitance-sensing circuit 101) can also configure some electrodes to be driven by a shield signal 126, as described herein. An intersection between two sense elements may be understood as a location at which one sense electrode crosses over or overlaps another, while maintaining galvanic isolation from each other. When a touch object, such as a finger or stylus, approaches the capacitive sense array 121, the object causes a decrease in mutual capacitance between some of the TX/RX electrodes. In another embodiment, the presence of a finger increases the coupling capacitance of the electrodes. Thus, the location of the finger on the capacitive sense array 121 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host 150.

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC®) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

In another embodiment, an electronic system includes a capacitive-sense array of multiple electrodes and a processing device coupled to the capacitive-sense array. The processing device is configured to selectively couple RX channels of a capacitance-sensing circuit to a first subset of the electrodes, selectively couple a shield signal to a second subset of the electrodes, and selectively couple an excitation signal to a third subset of the electrodes. The third subset includes barrier electrodes that are adjacent to edge electrodes of the first subset. The processing device measure signals from the first subset by the RX channels. The processing device optionally drives the second subset with the shield signal while measuring the signals on the first subset and drives the third subset with the excitation signal while measuring the signals on the first subset. The excitation signal is greater in magnitude than the optional shield signal.

In a further embodiment, the processing device further includes an ADC coupled to the one or more RX channels. The ADC converts the measured signal to digital values representing self-capacitance measurements of the first subset. The processing device also includes processing logic coupled to the ADC. The processing logic detects a proximity event of a conductive object based on the digital values. The third subset driven by the excitation signal increases a detection distance of the processing device.

In a further embodiment, the processing device further includes a signal generator to generate the excitation signal. The shield signal may be synchronized to the excitation signal. The shield signal may be less than 5 volts and the excitation signal may be greater than 5 volts. Alternatively, other voltage magnitudes may be used for the shield signal and the excitation signal.

In another embodiment, the processing device further includes a signal generator to generate the excitation signal, a signal source to provide the shield signal, and a multiplexer coupled to the electrodes, the signal generator, the signal source, and the RX channels. The multiplexer selectively couples the RX channels to the first subset, the signal source to the second subset, and the signal generator to the third subset in a first configuration. In a second configuration, the multiplexer r selectively couples the RX channels to a fourth subset of the electrodes, the signal source to a fifth subset of the electrodes, and the signal generator to a sixth subset of the electrodes. The sixth subset includes barrier electrodes that are adjacent to edge electrodes of the fourth subset. While in the second configuration, the processing logic measures additional signals form the fourth subset by the RX channels, drives the fourth subset with the shield signal while measuring the additional signals on the fourth subset, and drives the fifth subset with the excitation signal while measuring the additional signals on the fourth subset.

Figure 2:
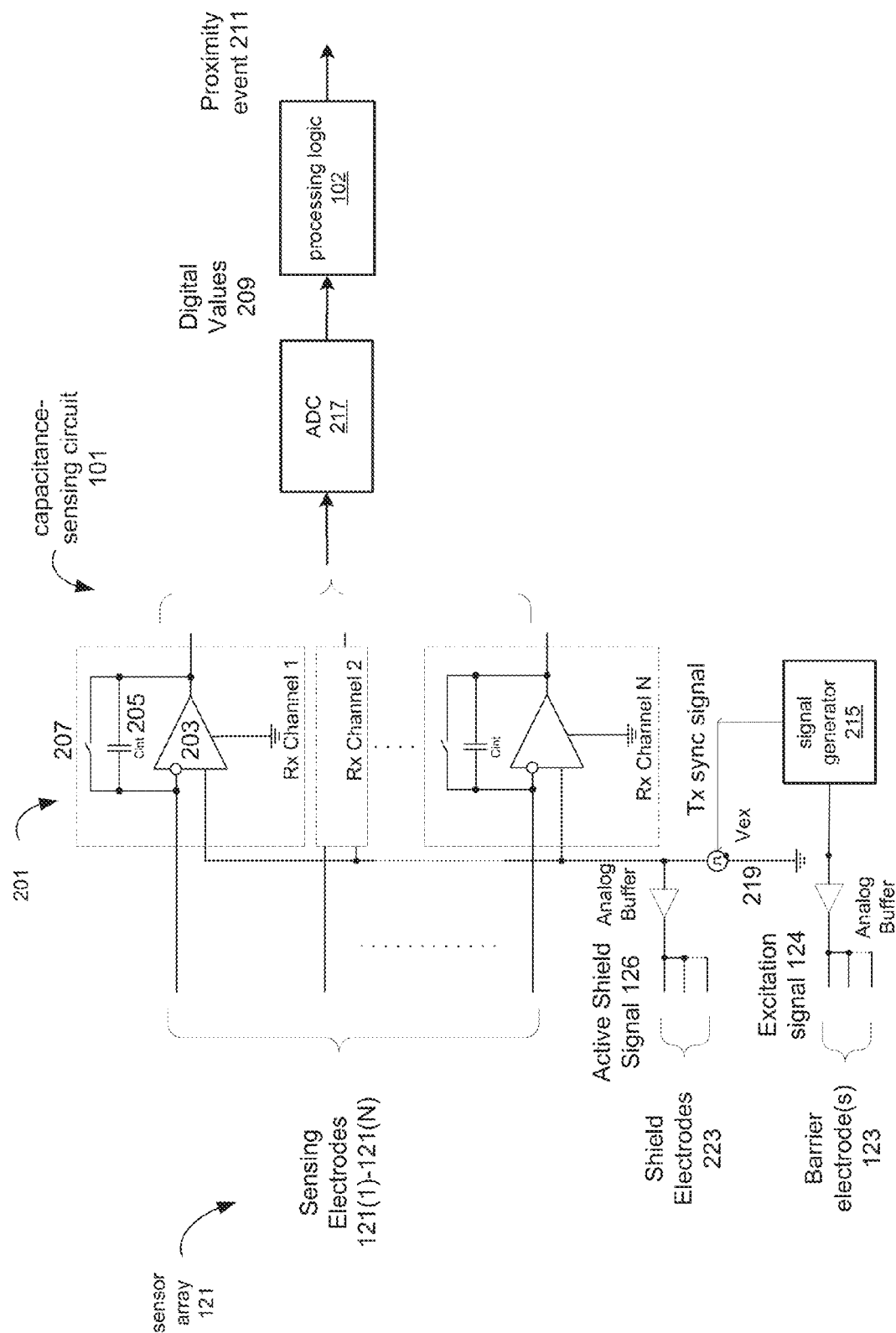
FIG. 2 is a block diagram illustrating an embodiment of a capacitance-sensing circuit for driving barrier electrodes and shield electrodes while measuring signals on sensing electrodes.

FIG. 2 is a block diagram illustrating an embodiment of a capacitance-sensing circuit for driving barrier electrodes and shield electrodes while measuring signals on sensing electrodes. In one embodiment, the capacitance-sensing circuit 101 includes multiple RX channels 201, an ADC 217, and a signal generator 215. Each RX channel 201 includes an operational amplifier 203, an integrator capacitor 205, and a switch 207. The operational amplifier 203 includes two inputs, one input coupled to one of the sensing electrodes 121, such as via an analog bus or a multiplexer (not illustrated), and the other input coupled to a voltage potential. The integrator capacitor 205 is coupled to the one input and the output of the operational amplifier 203. The RX channel measures a signal representing the self-capacitance of the respective sensing electrode 121. The individual RX channels 201 are coupled to individual sensing electrodes 121. However, in other embodiments, one RX channel 201 can be coupled to multiple sensing electrodes 121 that are coupled together (grouped or ganged together) by a multiplexer or other selection circuitry. The measured signals are output from the operational amplifier to the ADC 217 that converts the measured signals into digital values 209, representing a self-capacitance measurement of the respective sensing electrode 121. Processing logic 102 coupled to the ADC 217 can process the digital values 209 from the set of sensing electrodes 121 (also referred to herein as the first subset of electrodes) to detect a proximity event 211 of a conductive object based on the digital values 209. As described herein, driving the barrier electrode(s) 123 with the excitation signal 124 increases a detection distance for proximity events 211.

In addition to the RX channels, the capacitance-sensing circuit 101 includes the signal generator 215, which generates the excitation signal 124. An optional analog buffer may be used to buffer the excitation signal 124 being applied to the one or more barrier electrodes 123. In some embodiments, the capacitance-sensing circuit 101 drives electrodes that are not being measured by the RX channels with an active drive signal 126. The active drive signal 126 can be derived from a signal source 219. The signal source 219 may be another signal generator, a voltage source that supplies the voltage potential for the operational amplifiers 203, or the like. The voltage from the signal source 219 is smaller in magnitude than the voltage of the excitation signal 124 as descried herein. For example, the excitation signal 124 may be 10 V and the shield signal may be 3V. In one embodiment, the signal generator 215 may be the same signal generator used for generating a TX signal for mutual capacitance sensing. Alternatively, the signal generator 215 may be a dedicated signal generator for driving the barrier electrode(s) 123.

In a further embodiment, the active shield signal 126 can be synchronized to the excitation signal 124. This may be done by a TX sync signal from the signal generator 215 to the signal source 219. In another embodiment, the excitation signal 124 has a same periodicity as the shield signal 126. In another embodiment, different periodicity can be used for the excitation signal 124 and the active shield signal 126.

It should also be noted that the electrodes of the capacitive-sense array 121 that are not being measured by the RX channels 201 may be coupled to the active shield signal 126 in various configurations. Also, as illustrated in FIG. 2, the active shield signal 126 and excitation signal 124 can be applied to more than one electrodes of the capacitive-sense array 121. As described herein, the electrodes of the capacitive-sense array 121 can be reconfigured to be sensing electrodes 121(1)-121(N), shield electrodes (electrodes driven by the active shield signal 126), or barrier electrodes 123 (electrodes driven by the excitation signal 124) in various configurations.

When a conductive object, such as a finger, approaches the capacitive-sense array 121, the object causes a change in the measured capacitance. Thus, the changes in measured capacitance can be used to detect the proximity event 211 of the object.

In alternative embodiments, other methods for detecting the presence of a finger or other conductive object may be used where the finger or conductive object causes a decrease or increase in measured capacitance at one or more electrodes, which may be arranged in a grid or other pattern. For example, a finger placed near an electrode of a capacitive sensor may introduce an additional capacitance to ground that increases the total capacitance between the electrode and ground. The proximity event 211 can be determined based on changes in the measured capacitances. In further embodiments, a series of such digital codes measured from the electrodes, when compared to or offset by the associated codes of these same electrodes in an un-touched state, may be converted to touch coordinates indicating a position of an input on capacitive-sense array 121 by processing logic 102. The touch coordinates may then be used to detect gestures or perform other functions by the processing logic 102. In some embodiments, at least three RX channels are used to measure signals on the capacitive-sense array 121.

Proximity object detection is one of the key features of modern mobile devices with a capacitance touch screen. The conventional proximity solutions have limitations on how far away an object can be detected in proximity to the touch surface with the capacitive-sense array.

Figures 3A, 3B, 3C:
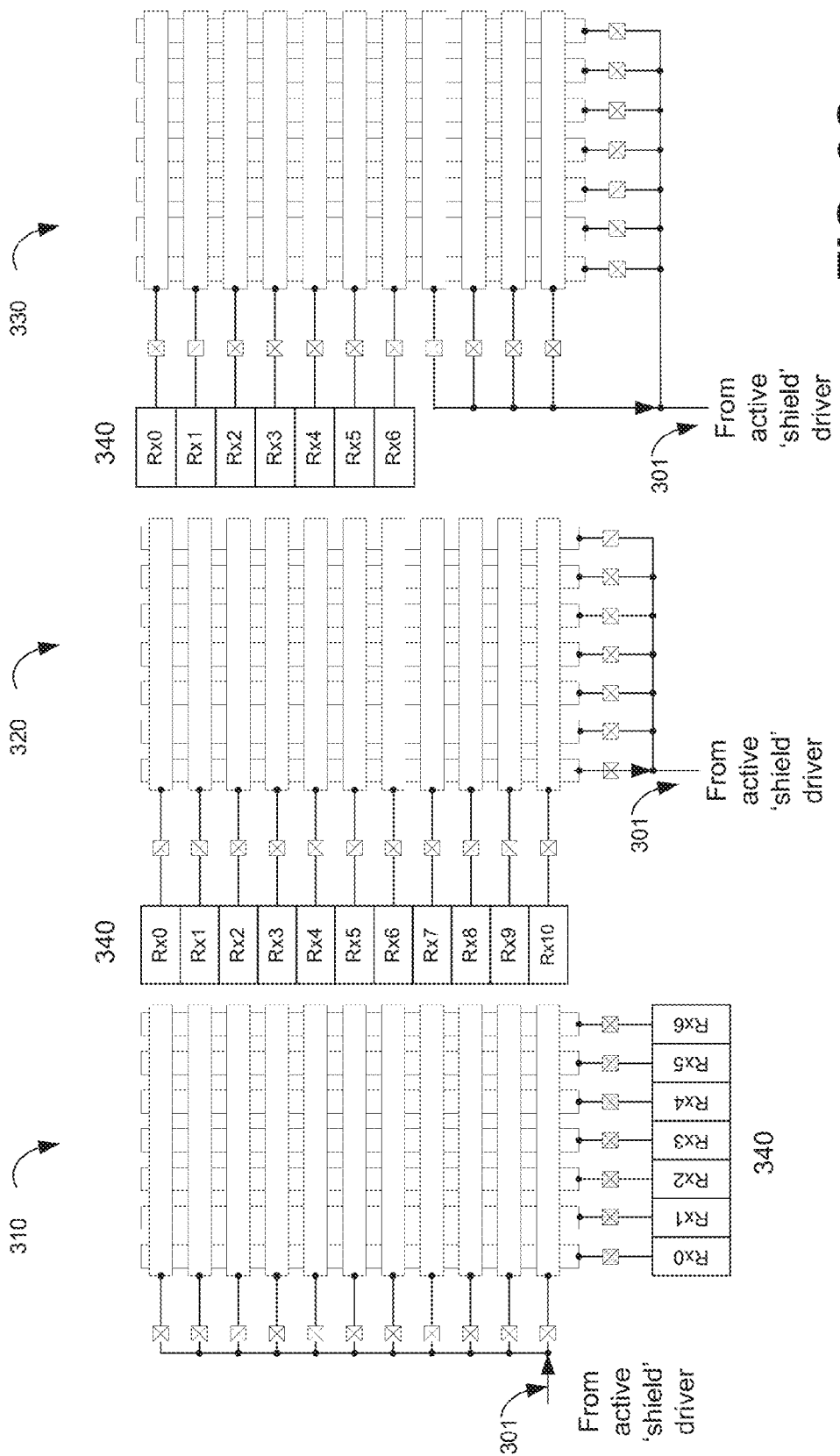
FIG. 3A illustrates a capacitive-sense array of two orthogonal layers with some electrodes driven with a shield signal according to one implementation.
FIG. 3B illustrates a capacitive-sense array of two orthogonal layers with some electrodes driven with a shield signal according to another implementation.
FIG. 3C illustrates a capacitive-sense array of two orthogonal layers with some electrodes driven with a shield signal according to another implementation.

A capacitance touch screen panel contains a capacitive-sense array. The capacitive-sense array is organized into two orthogonal layers, as row electrodes and column electrodes, such as illustrated in FIGS. 3A-3C. Touch coordinate recognition is the main function for these capacitive-sense arrays, however, the capacitive-sense array can also be used for proximity object detection. Proximity object detection does not need object coordinate recognition. For proximity detection, the capacitive-sense array can be configured for self-capacitance measurements of electrodes of the capacitive-sense array. Generally, the number of electrodes is bigger than the number of RX channels used to measure capacitance of the electrodes. For distinguishing electrodes, the electrodes coupled to the RX channels are considered sensing electrodes and those not being measured are non-measured electrodes. There are three variants for handling the non-measured electrodes while measuring the sensing electrodes. A first variant is to connect the non-measured electrodes to ground. A second variant is to leave the non-measured electrodes floating. A third variant is to connect the non-measured electrodes to an achieve shield signal, as illustrated in FIGS. 3A-3C.

For comparison, FIGS. 3A-3C illustrate a capacitive-sense array 310, 320, 330 of two orthogonal layers with electrodes being measured by RX channels 340 and some electrodes (non-measured electrodes) driven with a shield signal 301 according to one implementation. The shield signal 301 can be applied to multiple electrodes of the capacitive-sense arrays that are not being measured by the RX channels 340. In FIG. 3A, seven RX channels 340 are coupled to the column electrodes of the capacitive-sense array 310. In FIG. 3B, ten RX channels 340 are coupled to the row electrodes of the capacitive-sense array 320. In FIG. 3C, seven RX channels 340 are coupled to seven of the ten row electrodes of the capacitive-sense array 330. In these implementations, the electrodes are either coupled to the RX channels 340 or coupled to the shield signal 301 from an active shield driver.

The embodiments described below introduce barrier electrodes and excitation signals to increase a proximity object detection distance for proximity detection. For example, some current requirements for detection distance of a proximity object may be more than 25 mm. The embodiments described herein, in some cases, can increase the detection distance of conventional solutions by at least twenty percent. As described below, a third subset of electrodes is defined as barrier electrodes that can partially surround, or are adjacent to, the electrodes being measured (also referred to a first subset). This can increase sensitivity of the proximity detection. Driving the barrier electrodes can be used when measuring self-capacitance of the sensing electrodes to increase the sensitivity of proximity detection. Also, driving the barrier electrodes can be used in connection with driving other non-measured electrodes with the active shield signal 301. In another embodiment, mutual capacitance can be measured in a mutual capacitance mode or a self-capacitance and mutual capacitance mode. The capacitance-sensing circuit drives a transmit signal on a first electrode of a second subset of the electrodes and measures a receive signal on a second electrode of the first subset of the electrodes. The receive signal is representative of a mutual capacitance between the first electrode and the second electrode.

Figure 4:
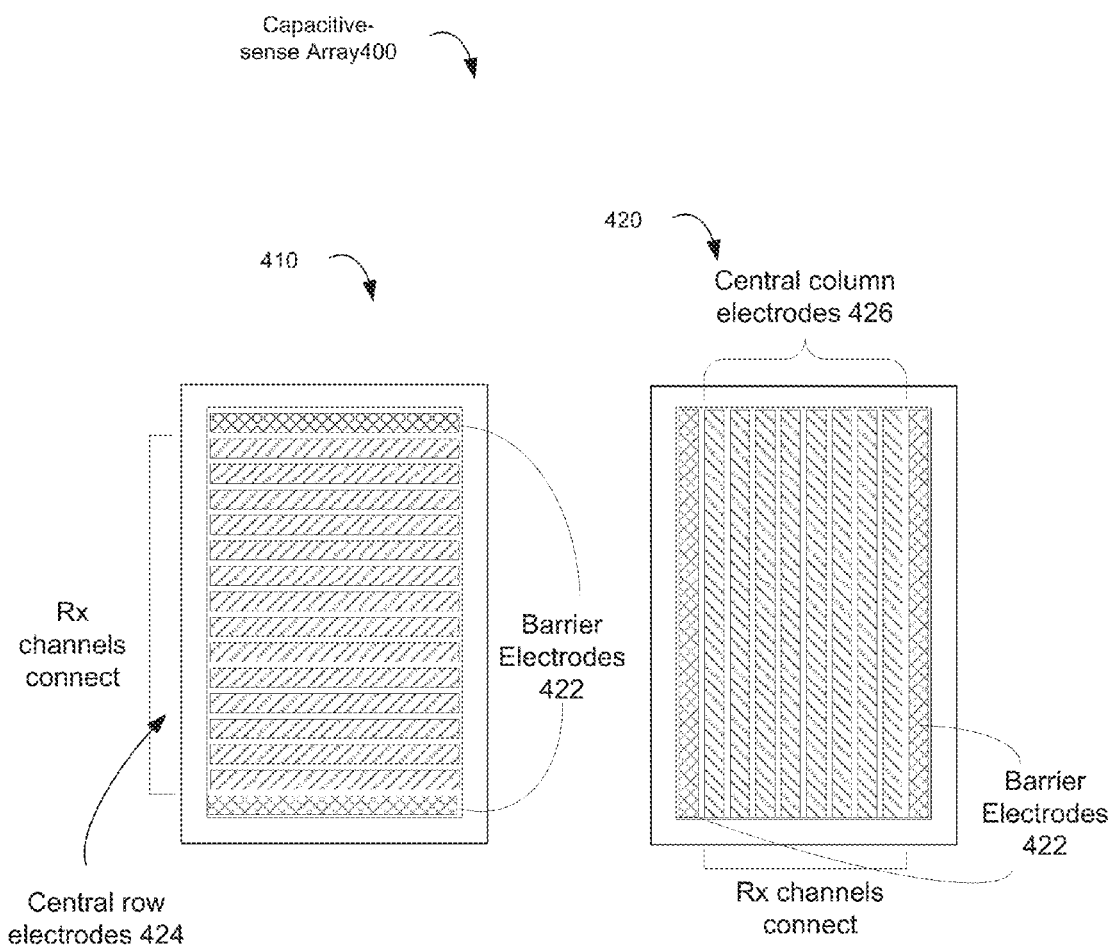
FIG. 4 illustrates two orthogonal layers a capacitive-sense array with barrier electrodes according to one embodiment.

FIG. 4 illustrates two orthogonal layers 410, 420 a capacitive-sense array 400 with barrier electrodes 422 according to one embodiment. The capacitive-sense array 400 includes multiple electrodes, some of which are designated as barrier electrodes 422. In a first layer 410, two row barrier electrodes 422 are disposed adjacent to multiple central row electrodes 424; one row barrier electrode 422 is adjacent to a top row electrode (also referred to as an edge electrode) of the central row electrodes 424 and another row barrier electrode 422 is adjacent to a bottom row of the central row electrodes 424. In a second layer 420, two column barrier electrodes 422 are disposed adjacent to multiple central column electrodes 426; one column barrier electrode 422 is adjacent to a left column electrode (also referred to as an edge electrode) of the central column electrodes 426 and another column barrier electrode 422 is adjacent to a right column electrode of the central column electrodes 426. In these embodiments, the barrier electrodes 422 are the top, bottom, left, and right edge electrodes of the capacitive-sense array 400. In other embodiments, the barrier electrodes 422 may not necessarily be the edge electrodes of the capacitive-sense array 400, but could be edges of a surface area of the electrodes that are currently being measured by the RX channels, as illustrated in FIG. 5C.

In another embodiment, the capacitance-sensing circuit is further operative to drive a first barrier electrode and a second barrier electrode with the excitation signal while measuring the signals on the first subset. The first barrier electrode is adjacent to an edge electrode of the first subset and the second barrier electrode is adjacent to another edge electrode of the first subset. In one embodiment, the capacitive-sense array 121 includes multiple row electrodes and multiple column electrodes. The barrier electrode is a first column electrode and the second barrier is a second column electrode. The first subset includes column electrodes that are between the first column electrode and the second column electrode. In another embodiment, the barrier electrode is a first row electrode and the second barrier is a second row electrode. The first subset includes row electrodes are between the first row electrode and the second row electrode. In another embodiment, the electrodes form a touch area and the barrier electrode is a first edge electrode within the touch area and the second barrier electrode is a second edge electrode within the touch area.

Figure 5D:
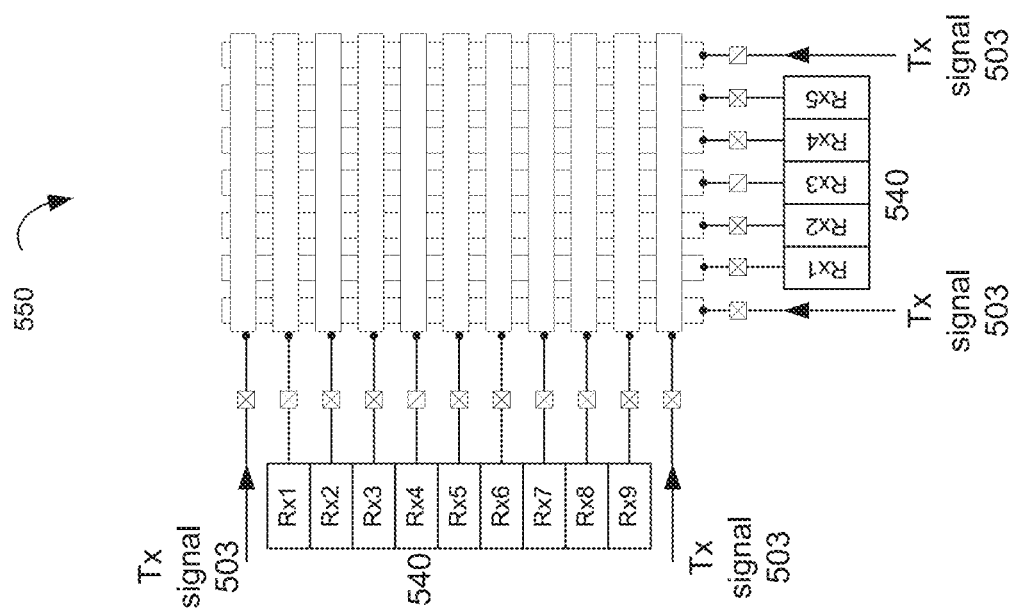
FIG. 5D illustrates a capacitive-sense array of two orthogonal layers with some electrodes driven with a shield signal and barrier electrodes driven with an excitation signal according to another embodiment

FIG. 5A-5D illustrates a capacitive-sense array of two orthogonal layers with some electrodes driven with a shield signal 501 and barrier electrodes driven with an excitation signal 503 according to one embodiment. FIGS. 5A-5D illustrate a capacitive-sense array 510, 520, 530, 550 of two orthogonal layers with electrodes being measured by RX channels 540, some electrodes (non-measured electrodes) driven with a shield signal 501, and some barrier electrodes driven with an excitation signal 503 (labeled TX signal 503). The shield signal 501 can be applied to multiple electrodes of the capacitive-sense arrays that are not being measured by the RX channels 340 and that are not designated as barrier electrodes. In FIG. 5A, five RX channels 540 are coupled to five of the seven column electrodes of the capacitive-sense array 510. In FIG. 5B, nine RX channels 540 are coupled to nine of the eleven row electrodes of the capacitive-sense array 520. In FIG. 5C, five RX channels 540 are coupled to five of the eleven row electrodes of the capacitive-sense array 530. In FIG. 5D, five RX channels 540 are coupled to five of the seven column electrodes of the capacitive-sense array 550, and nine RX channels 540 are coupled to nine of the eleven row electrodes of the capacitive-sense array 550. In these implementations, the electrodes are either coupled to the RX channels 540, coupled to the active shield signal 501 from an active shield driver, or the excitation signal 503 from another signal driver. In FIG. 5A, the barrier electrodes are the two column electrodes adjacent to the electrodes coupled to the RX channels 540; one column electrode to the left and one column electrode to the right. In FIG. 5B, the two barrier electrodes are the two row electrodes adjacent to the electrodes coupled to the RX channels 540; one row electrode above and one row electrode below. In FIG. 5C, the two barrier electrodes are the two row electrodes adjacent to the electrodes coupled to the RX channels 540; one row electrode above and one row electrode below. However, in FIG. 5C, there are additional row electrodes below the bottom barrier electrode that are coupled to the active signal shield 501. In FIG. 5D, the four barrier electrodes are the two column electrodes adjacent to the electrodes coupled to the RX channels 540 (one column electrode to the left and one column electrode to the right) the two row electrodes adjacent to the electrodes coupled to the RX channels 540 (one row electrode above and one row electrode below). Alternatively, other configurations of the barrier electrodes are possible in other embodiments.

By driving the barrier electrodes with the excitation signal, the sensitivity of measuring self-capacitance of the other electrodes is increased. In one embodiment, the edge electrodes connect to the excitation signal 503, which may be synchronous with the active shield signal 501. The excitation signal 503 has a higher voltage value than the active shield signal 501.

Figure 6:
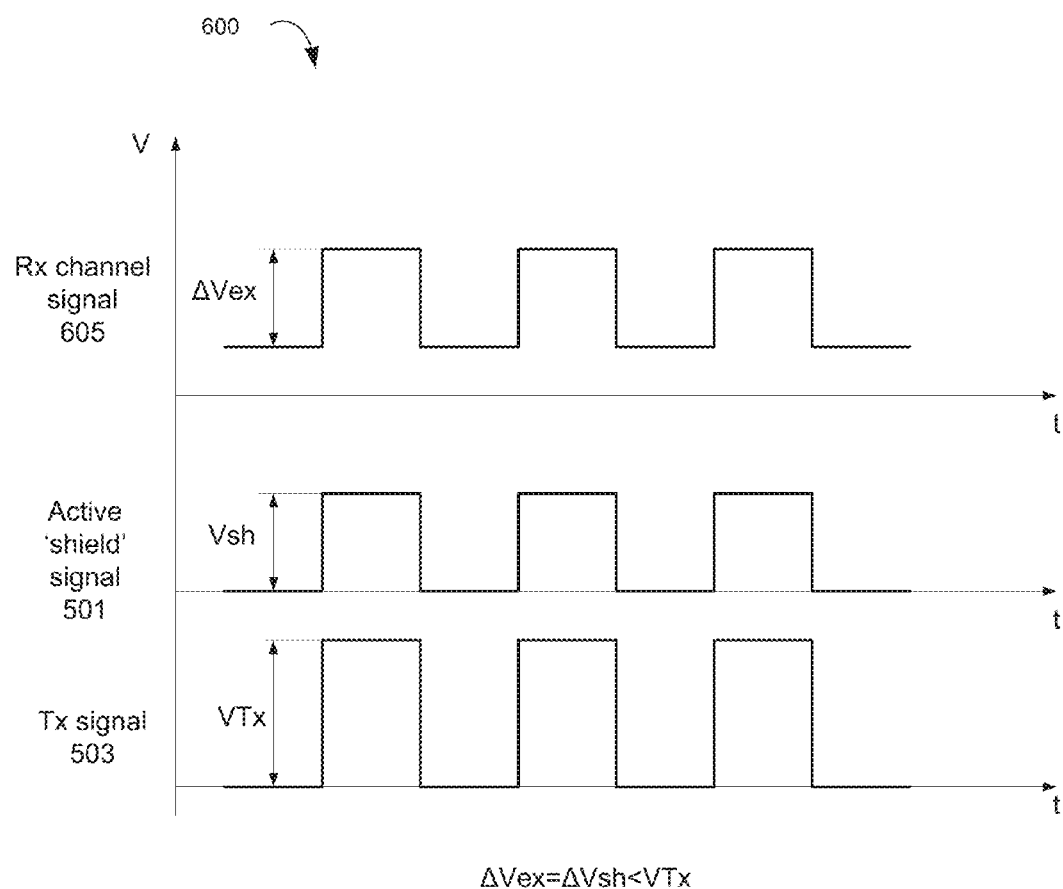
FIG. 6 is a waveform diagram illustrating an excitation signal waveform, a shield signal waveform, and receive channel signal waveforms according to one embodiment.

FIG. 6 is a waveform diagram 600 illustrating an excitation signal waveform, a shield signal waveform, and receive channel signal waveforms according to one embodiment. Diagram 600 illustrates the RX channel signal 605 (labeled ΔVex), the active shield signal 501 (labeled ΔVsh) and the excitation signal 503 (labeled VTx). The RX channel signal 605 is a voltage amplitude (swing voltage) measured by the RX channel, ΔVsh is the active shield driver output voltage amplitude, and VTx is the TX driver output voltage amplitude from the signal generator described herein. Diagram 600 illustrates that the active shield signal 501 is synchronized to excitation signal 503. Also, as described herein, the voltage magnitudes of the signals ΔVex and ΔVsh are the same or comparable, but the excitation signal 503 VTx is greater in magnitude than the signals ΔVex and ΔVsh. In one embodiment, the excitation signal 503 is 10 volts and the ΔVex and ΔVsh are 1.5-3.0 volts. In another embodiment, the shield signal 501 is less than 5 volts and the excitation signal 503 is greater than 5 volts. Of course, other voltages may be used, but the excitation signal 503 is greater in magnitude than at least the shield signal.

Figure 7A:
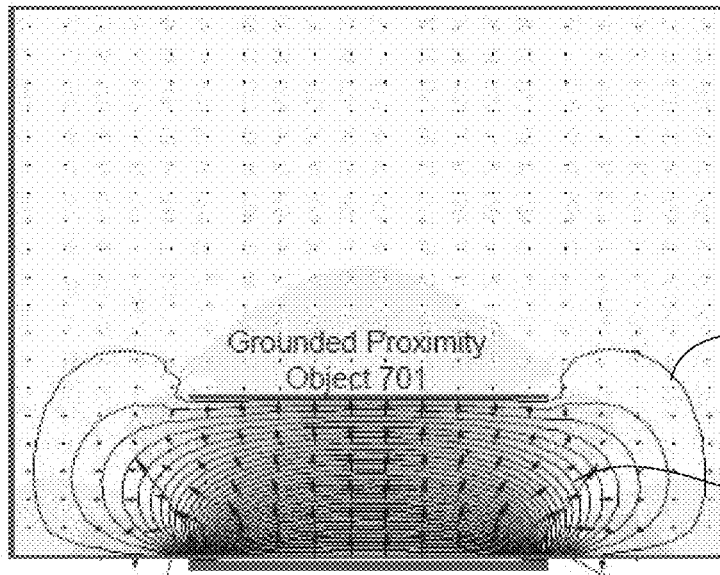
FIG. 7A illustrates electrostatic field distributions of a capacitive-sense array without barrier electrodes according to one implementation.
Figure 7B:
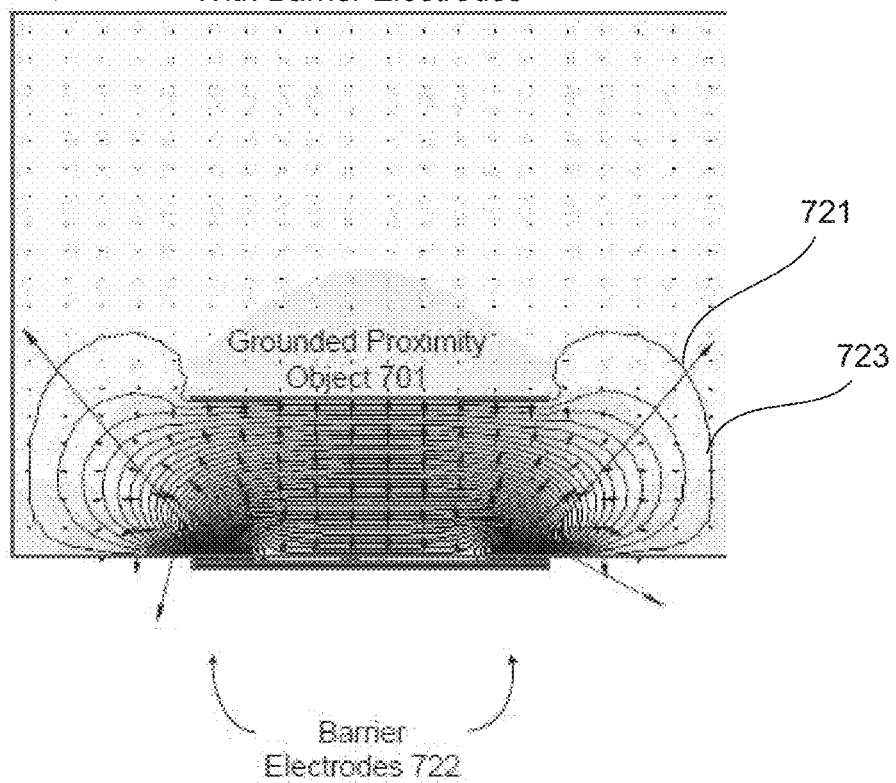
FIG. 7B illustrates electrostatic field distributions of a capacitive-sense array with barrier electrodes according to one embodiment.

As described herein, the use of barrier electrodes driven by an excitation signal increases a detection distance while measuring self-capacitance, such as illustrated by comparison of electrostatic field distributions of FIGS. 7A-7B.

FIG. 7A illustrates electrostatic field distributions of a capacitive-sense array 710 without barrier electrodes according to one implementation. FIG. 7B illustrates electrostatic field distributions of a capacitive-sense array 720 with barrier electrodes 722 according to one embodiment. A grounded proximity object 701 is touching an overlay above the capacitive-sense array 710 and capacitive-sense array 720. Arrows represent vectors of field strength E 711, 721 created when the proximity object 701 is proximate to the capacitive-sense arrays 710 and 720, respectively. Isolines 713, 723 are equipotential lines of field and a field strength vector normally directs to an isoline. The value of the isoline is inversely proportional to a distance between neighboring isolines. Projection of field strength in a Y-axis distribution (Ey) can be seen to be increased in FIG. 7B, as compared to FIG. 7A. Driving the barrier electrodes 722 with the excitation signal increases sensitivity of the capacitive-sense array 720, as compared to the capacitive-sense array 710.

Figure 8:
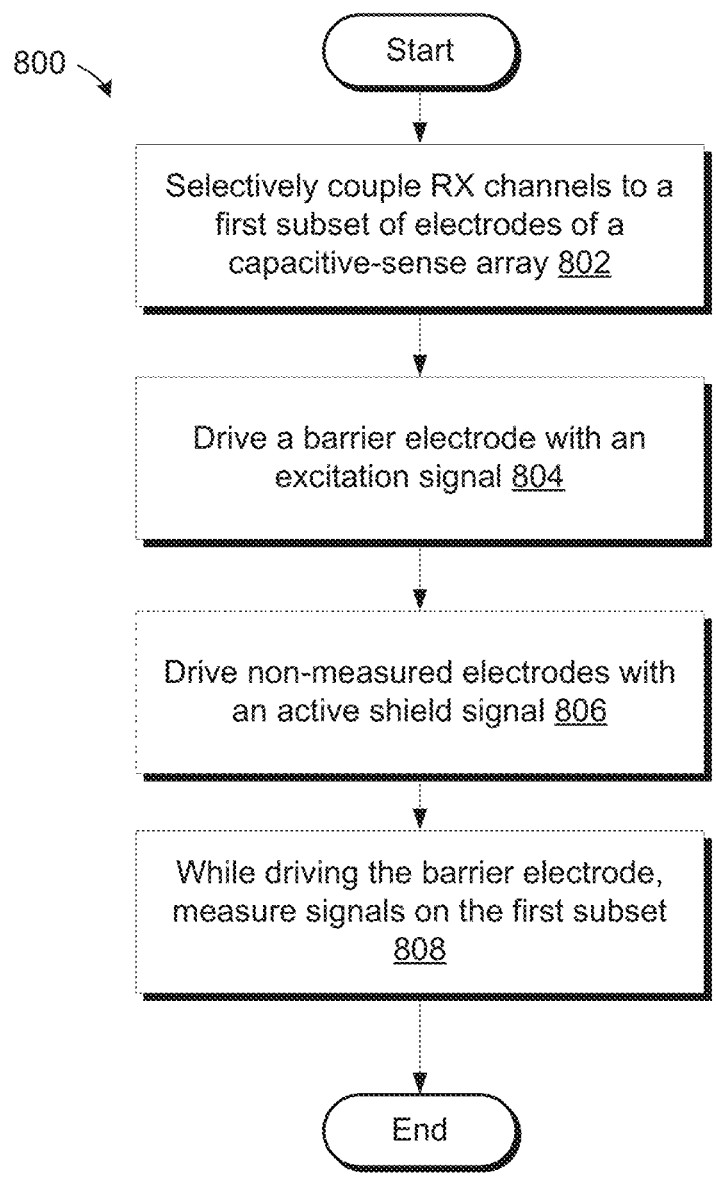
FIG. 8 is a flow diagram of a method of driving barrier electrodes with an excitation signal for proximity sensing according to one embodiment.

FIG. 8 is a flow diagram of a method 800 of driving barrier electrodes with an excitation signal for proximity sensing according to one embodiment. The method 800 may be performed by processing logic that may include hardware (circuitry, dedicated logic, etc.), software (such as is run on a general purpose computing system or a dedicated machine), firmware (embedded software), or any combination thereof. In one embodiment, the processing device 110 of FIG. 1 performs some or all of method 800. In another embodiment, the capacitance-sensing circuit 101 and the processing logic 102 of FIG. 1 or FIG. 2 performs some or all of the operations of method 800. Alternatively, other components of the electronic system 100 of FIG. 1 perform some or all of the operations of method 800.

In FIG. 8, method 800 begins with the processing logic with selectively coupling RX channels of a capacitance-sensing circuit to a first subset of electrodes of a capacitive-sense array (block 802). The processing logic drives a barrier electrode with an excitation signal (block 804). The barrier electrode is adjacent to an edge electrode of the first subset that is coupled to one of the RX channels. Optionally, the processing logic drives non-measured electrodes with an active shield signal (block 806). The excitation signal is greater in magnitude than the signals measured on the first subset and the excitation signal is greater in magnitude than the active shield signal. While driving the barrier electrode (and optionally the active shield signal), the processing logic measures signals on the first subset (block 808).

In a further embodiment, the processing logic converts the measured signals to digital values representing self-capacitance measurements of the first subset, and detects a proximity event of a conductive object based on the digital values. The barrier electrode driven by the excitation signal increases a detection distance of the capacitance-sensing circuit.

In a further embodiment, the processing logic drives a second subset of the electrodes with a shield signal while measuring the signals on the first subset. In this embodiment, the excitation signal is greater in magnitude than the shield signal. The shield signal may be synchronized to the excitation signal. In another embodiment, the shield signal is a voltage potential, such as a direct current (DC) voltage and the excitation signal is a periodic signal.

The processing logic can be implemented in a capacitive touch screen controller. In one embodiment, the capacitive touch screen controller is the TrueTouch® capacitive touch-screen controllers, such as the CY8CTMA4xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports leading operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising a capacitance-sensing circuit coupled to a capacitive-sense array comprising a plurality of electrodes, wherein the capacitance-sensing circuit comprises a plurality of sensing channels and is operative to:

measure signals on a first subset of the plurality of electrodes using the plurality of sensing channels, wherein each of the plurality of sensing channels is coupled to one of the first subset of the plurality of electrodes;

drive a first barrier electrode of the plurality of electrodes with an excitation signal while measuring the signals on the first subset, wherein the excitation signal is greater in magnitude than the measured signals, and wherein the first barrier electrode is adjacent to an edge electrode of the first subset of the plurality of electrodes coupled to one of the plurality of sensing channels;

drive a second barrier electrode of the plurality of electrodes with the excitation signal while measuring the signals on the first subset, wherein the second barrier electrode is adjacent to another edge electrode of the first subset of the plurality of electrodes coupled to another one of the plurality of sensing channels;

drive a second subset of the plurality of electrodes with a shield signal while measuring the signals on the first subset, wherein the excitation signal is greater in magnitude than the shield signal, wherein the plurality of electrodes of the capacitive-sense array comprises a plurality of row electrodes and a plurality of column electrodes, and wherein the first barrier electrode is a first column electrode of the plurality of column electrodes, the second barrier electrode is a second column electrode of the plurality of column electrodes, and the first subset includes column electrodes of the plurality of column electrodes, the column electrodes being between the first column electrode and the second column electrode.

2. The apparatus of claim 1, wherein the capacitance-sensing circuit is further operative to convert the measured signals to digital values representing self-capacitance measurements of the first subset, and wherein the apparatus further comprises processing logic coupled to the capacitance-sensing circuit, wherein the processing logic is operative to detect a proximity event of a conductive object based on the digital values, wherein the barrier electrode driven by the excitation signal increases a detection distance of the apparatus.

3. The apparatus of claim 1, wherein the shield signal is synchronized with the excitation signal.

4. The apparatus of claim 1, wherein the plurality of sensing channels comprises three or more sensing channels, wherein the three or more sensing channels measure the signals on three or more of the first subset of the plurality of electrodes, wherein the measured signal from the respective electrode is representative of a self-capacitance of the respective electrode.

5. The apparatus of claim 1, wherein the capacitance-sensing circuit is further to: drive a transmit signal on a first electrode of the second subset of the plurality of electrodes; and measure a receive signal on a second electrode of the first subset of the plurality of electrodes using one of the plurality of sensing channels, wherein the receive signal is representative of a mutual capacitance between the first electrode and the second electrode.

6. The apparatus of claim 1, wherein at least one of the plurality of sensing channels comprises:
an integrator capacitor;
a switch; and
an operational amplifier, and wherein the capacitance-sensing circuit further comprises:
a signal generator to generate the excitation signal;
an analog-to-digital converter (ADC); and
processing logic.

7. A method comprising:
coupling a plurality of receive channels of a capacitance-sensing circuit to a first subset of a plurality of electrodes of a capacitive-sense array;
measuring signals on the first subset by the capacitance-sensing circuit;
driving a barrier electrode of the plurality of electrodes with an excitation signal while measuring the signals on the first subset, wherein the excitation signal is greater in magnitude than the signals measured on the first subset, wherein the barrier electrode is adjacent to an edge electrode of the first subset of the plurality of electrodes coupled to one of the plurality of receive channels;
driving a second subset of the plurality of electrodes with a shield signal while measuring the signals on the first subset, wherein the execution signal is greater in magnitude than the shield signal;
driving a transmit signal on a first electrode of a second subset of the plurality of electrodes; and measuring a receive signal on a second electrode of the first subset of the plurality of electrodes using one of the plurality of sensing channels, wherein the receive signal is representative of a mutual capacitance between the first electrode and the second electrode.

8. The method of claim 7, further comprising:
converting the measured signals to digital values representing self-capacitance measurements of the first subset; and
detecting a proximity event of a conductive object based on the digital values, wherein the barrier electrode driven by the excitation signal increases a detection distance of the capacitance-sensing circuit.

9. An apparatus comprising:
a capacitive-sense array of a plurality of electrodes; and
a processing device coupled to the capacitive-sense array, wherein the processing device is configured to:
selectively couple sensing channels of a capacitance-sensing circuit to a first subset of the plurality of electrodes;
selectively couple a shield signal to a second subset of the plurality of electrodes; and
selectively couple an excitation signal to a third subset of the plurality of electrodes, wherein the third subset includes a first barrier electrode that is adjacent to an edge electrode of the first subset;
measure signals from the first subset by the sensing channels at a first phase;
drive the second subset with the shield signal while measuring the signals on the first subset; and
drive the third subset with the excitation signal while measuring the signals on the first subset, wherein the excitation signal is greater in magnitude than the shield signal;
selectively couple an excitation signal to a fourth subset of the plurality of electrodes, wherein the fourth subset includes a second barrier electrode that adjacent to an edge electrode of the first subset;
measure signals from the first subset by the sensing channels at a second phase;
drive the second subset with the shield signal while measuring the signals on the first subset; and
drive the fourth subset with the excitation signal while measuring the signals on the first subset, wherein the excitation signal is greater in magnitude than the shield signal,
wherein the plurality of electrodes of the capacitive-sense array comprises a plurality of row electrodes and a plurality of column electrodes, wherein the first barrier electrode is a first column electrode of the plurality of column electrodes, the second barrier electrode is a second column electrode of the plurality of column electrodes, and the first subset includes column electrodes of the plurality of column electrodes, the column electrodes being between the first column electrode and the second column electrode.

10. The apparatus of claim 9, wherein the processing device comprises:
an analog-to-digital converter (ADC) coupled to one or more of the sensing channels, the ADC to convert the measured signal to digital values representing self-capacitance measurements of the first subset; and
processing logic coupled to the ADC, the processing logic to detect a proximity event of a conductive object based on the digital values, wherein the third subset driven by the excitation signal increases a detection distance of the processing device.

11. The apparatus of claim 9, wherein the processing device further comprises a signal generator to generate the excitation signal, wherein the shield signal is synchronized to the excitation signal.

12. The apparatus of claim 11, wherein the shield signal is less than 5 volts and the excitation signal is greater than 5 volts.

13. The apparatus of claim 9, wherein the processing device further comprises:
- a signal generator to generate the excitation signal;
- a signal source to provide the shield signal; and
- a multiplexer coupled to the plurality of electrodes, the signal generator, the signal source, and the sensing channels, wherein the multiplexer selectively couples the sensing channels to the first subset, the signal source to the second subset, and the signal generator to the third and fourth subset in a first configuration, and wherein the multiplexer selectively couples the sensing channels to a fifth subset of the plurality of electrodes, the signal source to a sixth subset of the plurality of electrodes, and the signal generator to a seventh subset of the plurality of electrodes in a second configuration, wherein the seventh subset includes barrier electrodes that are adjacent to edge electrodes of the fifth subset, and
- wherein the processing device, while in the second configuration,
  - measures additional signals from the fifth subset by the sensing channels,
  - drives the fifth subset with the shield signal while measuring the additional signals on the fifth subset, and
  - drives the sixth subset with the excitation signal while measuring the additional signals on the fifth subset.

14. An apparatus comprising a capacitance-sensing circuit coupled to a capacitive-sense array comprising a plurality of electrodes, wherein the capacitance-sensing circuit comprises a plurality of sensing channels and is operative to:
- measure signals on a first subset of the plurality of electrodes using the plurality of sensing channels, wherein each of the plurality of sensing channels is coupled to one of the first subset of the plurality of electrodes;
- drive a first barrier electrode of the plurality of electrodes with an excitation signal while measuring the signals on the first subset, wherein the excitation signal is greater in magnitude than the measured signals, and wherein the first barrier electrode is adjacent to an edge electrode of the first subset of the plurality of electrodes coupled to one of the plurality of sensing channels;
- drive a second barrier electrode of the plurality of electrodes with the excitation signal while measuring the signals on the first subset, wherein the second barrier electrode is adjacent to another edge electrode of the first subset of the plurality of electrodes coupled to another one of the plurality of sensing channels;
- drive a second subset of the plurality of electrodes with a shield signal while measuring the signals on the first subset,
- wherein the excitation signal is greater in magnitude than the shield signal,
- wherein the plurality of electrodes of the capacitance sense array comprises a plurality of row electrodes and a plurality of column electrodes, wherein the first barrier electrode is a first row electrode of the plurality of row electrodes, the second barrier is a second row electrode of the plurality of row electrodes, and the first subset includes row electrodes of the plurality of row electrodes, the row electrodes being between the first row electrode and the second row electrode.

15. The apparatus of claim 14, further comprising the capacitive-sense array, wherein the capacitive-sense array, wherein the plurality of electrodes form a touch area, and wherein the first barrier electrode is a first edge electrode within the touch area and the second barrier electrode is a second edge electrode within the touch area.

* * * * *